UNITED STATES PATENT OFFICE.

JOHN KAY HAWKINS, OF MOHAWK, TENNESSEE.

MANUFACTURE OF PAINT.

SPECIFICATION forming part of Letters Patent No. 493,999, dated March 21, 1893.

Application filed September 8, 1892. Serial No. 445,344. (No specimens.)

*To all whom it may concern:*

Be it known that I, JOHN KAY HAWKINS, of Mohawk, in the county of Greene and State of Tennessee, have invented certain new and useful Improvements in Paints; and I do hereby declare the following to be a full, clear, and exact description of the invention, such as will enable others skilled in the art to which it pertains to make and use it, reference being had to the accompanying drawings, which form part of this specification.

This invention relates to certain improvements in the manufacture of paints, and consists in a process as more particularly and fully pointed out hereinafter.

This paint is more particularly intended for use on roofs and exposed surfaces, as it is sufficiently elastic to permit expansion and contraction without cracking and will not be affected by extremes of heat and cold.

In carrying out my invention I dissolve a suitable proportion of resin, say three pounds, in a suitable proportion, say one gallon, of benzine or gasoline. This solution is about the consistency of sirup and is then poured over lime, while in the act of slaking and which has been previously treated with water. The steam always generated when lime is being slaked thoroughly agitates and stirs the mass by passing through the same in bubbles and distributes fine particles of lime throughout the mass so that lime in a finely divided state is thoroughly incorporated and combined with the solution of resin. After the lime becomes completely slaked the liquid compound is strained or poured from the lime.

A suitable proportion of crude gutta-percha is then dissolved in bisulphide of carbon, and is added to the above mentioned solution.

A suitable coloring matter is then added and thoroughly mixed with the solution and the paint is ready for use.

The lime in the solution thoroughly deodorizes and preserves it and imparts desired drying properties to the paint, and the peculiar qualities of the lime desired in the paint are more thoroughly and effectively obtained by slaking the lime as described in the solution.

The gutta-percha and resin render the paint elastic and give it consistency and tenacity.

Having thus fully described my invention, what I claim, and desire to secure by Letters Patent, is—

The herein described mode of preparing paint, which consists in dissolving a suitable quantity of resin in benzine or gasoline, then placing said solution with lime treated with water to cause slaking so that the lime will slake in said solution and the steam generated will agitate and thoroughly mix particles of the lime in the solution, then pouring off the solution from the lime and then mixing dissolved rubber or gutta-percha in the solution, substantially as shown and described.

In testimony whereof I affix my signature in presence of two witnesses.

JOHN KAY HAWKINS.

Witnesses:
R. L. MILES,
J. B. LOTSPEICH.